United States Patent [19]
Krepski et al.

[11] Patent Number: 5,929,160
[45] Date of Patent: Jul. 27, 1999

[54] METHOD FOR REDUCING WATER UPTAKE IN SILYL TERMINATED SULFOPOLY (ESTER-URETHANES)

[75] Inventors: Larry R. Krepski, White Bear Lake; Steven M. Heilmann, Afton; Daniel E. Mickus, Mahtomedi; Wayne K. Larson, Maplewood, all of Minn.

[73] Assignee: Minnesota Mining and Manufacturing Company, St. Paul, Minn.

[21] Appl. No.: 08/937,487

[22] Filed: Sep. 25, 1997

[51] Int. Cl.$^6$ ................ C08J 3/00; C08K 3/20; C08L 75/00; C08L 83/00
[52] U.S. Cl. ............ 524/590; 524/539; 524/588; 524/589; 524/591; 524/839; 524/840; 528/28
[58] Field of Search ................. 524/539, 588, 524/589, 590, 591, 839, 840; 528/28

[56] References Cited

U.S. PATENT DOCUMENTS

| | | | |
|---|---|---|---|
| 3,600,359 | 8/1971 | Miranda et al. | 260/77.5 |
| 3,700,643 | 10/1972 | Smith et al. | 250/77.5 |
| 3,821,281 | 6/1974 | Radimann et al. | 260/470 |
| 3,941,733 | 3/1976 | Chang | 260/29.2 |
| 4,012,114 | 3/1977 | Eigenmann | 350/104 |
| 4,150,946 | 4/1979 | Neel et al. | 8/115.6 |
| 4,307,219 | 12/1981 | Larson | 528/71 |
| 4,367,919 | 1/1983 | Tung et al. | 350/105 |
| 4,558,149 | 12/1985 | Larson | 560/14 |
| 4,564,556 | 1/1986 | Lange | 428/325 |
| 4,638,017 | 1/1987 | Larson et al. | 521/157 |
| 4,738,992 | 4/1988 | Larson et al. | 521/157 |
| 4,746,717 | 5/1988 | Larson | 528/68 |
| 4,758,469 | 7/1988 | Lange | 428/325 |
| 4,855,384 | 8/1989 | Larson | 528/60 |
| 4,937,127 | 6/1990 | Haenggi et al. | 428/148 |
| 5,053,253 | 10/1991 | Haenggi et al. | 427/204 |
| 5,094,902 | 3/1992 | Haenggi et al. | 428/150 |
| 5,124,178 | 6/1992 | Haenggi et al. | 427/204 |

FOREIGN PATENT DOCUMENTS

| | | |
|---|---|---|
| 0164314 | 12/1985 | European Pat. Off. |
| 1006579 | 10/1965 | United Kingdom |
| WO 9108244 | 6/1991 | WIPO |
| WO/A/94/13723 | 6/1994 | WIPO |
| WO 9703252 | 1/1997 | WIPO |

*Primary Examiner*—Patrick D. Niland
*Attorney, Agent, or Firm*—Lorraine R. Sherman; Philip Y. Dahl

[57] ABSTRACT

A method of decreasing the water uptake in a sulfopoly (ester-urethane) by preparing said sulfopoly(ester-urethane) from a chain extended sulfopolyester polyol which itself has been prepared in a two-step method, said sulfopoly(ester-urethane) comprising in its backbone at least one non-terminal arylene or alkylene group comprising a pendant sulfonic acid group or salt thereof, said sulfonic acid group or salt thereof having the formula

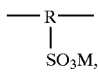

wherein R is a trivalent aliphatic or aromatic group and M is a cation, said sulfonic acid group or salt thereof being bonded directly through said aliphatic or aromatic group to ester groups, the polymer of said sulfo(polyester-urethane) being terminated by at least one hydrolyzable silyl group, said two-step method for preparing said chain extended sulfopolyester polyol comprising the steps of:

a) reacting a sulfopolycarboxylic acid or ester with a polyol to produce a sulfopolyester polyol, b) chain extending said sulfopolyester polyol by an esterification reaction with a lower aliphatic lactone to produce a chain extended sulfopolyester polyol, and said chain extended sulfopolyester polyol then, (1) in one embodiment, being reacted with a stoichiometric excess of a polyisocyanate and at least one of a polyol, polyamine, and polythiol to produce an isocyanate-terminated sulfo (polyester-urethane), which is then reacted with a nucleophilic, hydrolyzable silane or (2) in a second embodiment, being reacted with a polyisocyanate and a stoichiometric excess of at least one of a polyol, polyamine, and polythiol to produce a hydroxyl-, amino-, or mercapto-terminated sulfo(polyester-urethane) which is then reacted with an electrophilic hydrolyzable silane to produce said sulfopoly(ester-urethane), which when dried has decreased water uptake.

20 Claims, No Drawings

METHOD FOR REDUCING WATER UPTAKE IN SILYL TERMINATED SULFOPOLY (ESTER-URETHANES)

FIELD OF THE INVENTION

This invention relates to water dispersible sulfopoly(ester-urethane) compositions terminated by silyl groups and containing solubilizing sulfonate groups which aid dispersibility. The sulfopoly(ester-urethane) compositions provide coatings for textiles, paper, wood, leather, glass, ceramics, porcelain, metal, plastics, stone, concrete, and asphalt.

BACKGROUND OF THE INVENTION

Protective or decorative coatings are applied to many different substrates, for example, textiles, paper, wood, leather, glass, ceramics, porcelain, metal, plastics, stone, concrete, and asphalt. Coatings may provide protection of the substrate from corrosion, oxidative aging, mechanical damage, or weathering. For application outdoors or in humid environments, it is generally desirable to utilize polymeric coatings with low water uptake. Water uptake by the coating can lead to plasticization or hydrolysis reactions of the polymer coating with resultant degradation of useful properties such as toughness, weatherability, and abrasion resistance. In addition, water uptake by a coating can lead to accelerated corrosion of a corrosion sensitive substrate as well as loss of adhesion of the coating to the substrate.

Pavement markings are examples of coatings which are subject to wear and must withstand severe use. They are installed on roads to delineate and to provide guidance, warning, and regulatory information to motorists and pedestrians. Important characteristics of pavement markings are low water uptake, durability, reasonable cost, ease in method of installation, handling and installation safety, and visibility.

Other utilities where materials are exposed to conditions of variable humidity include protective coatings on motor vehicles, and coatings on many substrates such as leather, wood, ceramics, textiles, or glass that can benefit from resistance to water uptake.

For environmental reasons and to meet EPA requirements regarding the amount of volatile organic compounds (VOCs) allowable in coating materials, it is highly desirable to apply coatings from water rather than from organic solvents. There has been a continuing search for waterborne materials which produce coatings with reduced water uptake.

SUMMARY OF THE INVENTION

It has now been found that sulfopoly(ester-urethane)s which are terminated with silyl groups and contain solubilizing sulfonic acid functional groups and that are prepared from a chain extended sulfopolyester polyol which itself has been prepared in two-step method exhibit decreased water uptake compared to sulfopoly(ester-urethanes) prepared from sulfopolyester polyols prepared by conventional methods.

Briefly, this invention provides a method of decreasing the water uptake in a sulfopoly(ester-urethane) comprising preparing a sulfopoly(ester-urethane) from a chain extended sulfopolyester polyol which itself has been prepared in a two-step method, said sulfopoly(ester-urethane) comprising in its backbone at least one non-terminal arylene or alkylene group comprising a pendant sulfonic acid group or salt thereof, said sulfonic acid group or salt thereof having the formula

wherein R is a trivalent aliphatic or aromatic group and M is a cation, said sulfonic acid group or salt thereof being bonded directly through said aliphatic or aromatic group to ester groups, the polymer of said sulfo(polyester-urethane) being terminated by at least one hydrolyzable silyl group, said two-step method for preparing said chain extended sulfopolyester polyol comprising the steps of:

a) reacting a sulfopolycarboxylic acid or ester with a polyol to produce a sulfopolyester polyol, b) chain extending said sulfopolyester polyol by an esterification reaction with a lower aliphatic lactone to produce a chain extended sulfopolyester polyol, and said chain extended sulfopolyester polyol then, (1) in one embodiment, being reacted with a stoichiometric excess of a polyisocyanate and at least one of a polyol, polyamine, and polythiol to produce an isocyanate-terminated sulfo(polyester-urethane), which is then reacted with a nucleophilic, hydrolyzable silane, or (2) in a second embodiment, being reacted with a polyisocyanate and a stoichiometric excess of at least one of a polyol, polyamine, and polythiol to produce a hydroxyl-, amino-, or mercapto-terminated sulfo (polyester-urethane) which is then reacted with an electrophilic hydrolyzable silane to produce said sulfopoly(ester-urethane), which when dried has decreased water uptake.

In a preferred embodiment, the sulfopoly(ester-urethane)s are dispersed in water and may include a pigment. Upon removal of water the polymers crosslink into a tough polymer film which is weather and abrasion resistant. Each of the polymers comprises segments containing one or more hydrophilic sulfonic acid or sulfonic acid salt groups and at least one hydrophobic group containing one or more hydrolyzable silyl group at its terminus. The compositions of the invention preferably have a sulfonate equivalent weight of about 500 to about 12,000, preferably 2,000 to about 10,000 and more preferably about 4,000 to about 8,000 g/equivalent. The compositions preferably have a number average molecular weight less than 50,000, preferably 2,000 to less than 50,000, and more preferably 2,000 to less than 30,000, and most preferably 2,000 to less than 20,000.

In another aspect, the invention provides a sulfopoly (ester-urethane) having decreased water uptake wherein said sulfopoly(ester-urethane) is prepared from a chain extended sulfopolyester polyol which itself has been prepared in a two-step method, said sulfopoly(ester-urethane) comprising in its backbone at least one non-terminal arylene or alkylene group comprising a pendant sulfonic acid group or salt thereof, said sulfonic acid group or salt thereof having the formula

wherein R is a trivalent aliphatic or aromatic group and M is a cation, said sulfonic acid group or salt thereof being bonded directly through said aliphatic or aromatic group to ester groups, the polymer of said sulfo(polyester-urethane) being terminated by at least one hydrolyzable silyl group, said two-step method for preparing said chain extended sulfopolyester polyol comprising the steps of:

a) reacting a sulfopolycarboxylic acid or ester with a polyol to produce a sulfopolyester polyol,
b) chain extending said sulfopolyester polyol by an esterification reaction with a lower aliphatic lactone to produce a chain extended sulfopolyester polyol, and said chain extended sulfopolyester polyol then, (1) in one embodiment, being reacted with a stoichiometric excess of a polyisocyanate and at least one of a polyol, polyamine, and polythiol to produce an isocyanate-terminated sulfo(polyester-urethane), which is then reacted with a nucleophilic, hydrolyzable silane, or (2) in a second embodiment, being reacted with a polyisocyanate and a stoichiometric excess of at least one of a polyol, polyamine, and polythiol to produce a hydroxyl-, amino-, or mercapto-terminated sulfo (polyester-urethane) which is then reacted with an electrophilic hydrolyzable silane to produce said sulfopoly(ester-urethane), which when dried has decreased water uptake.

The invention comprises aqueous dispersions comprising up to 70 percent by weight of the sulfopoly(ester-urethane) compositions and 30 weight percent or more of solvents such as water or organic solvents (e.g., methyl ethyl ketone, acetone, and N-methylpyrrolidinone) and optionally adjuvants in amounts suitable for their intended purpose.

Preparation of the sulfopoly(ester-urethane)s involves reaction of a polyol which contains a sulfo group, also known as a sulfopolyol, with a polyisocyanate, optionally in the presence of any of other different diols, diamines, or bis-mercaptans, and preferably in the presence of a suitable catalyst, optionally in a non-reactive organic solvent. In a conventional method of preparation of the sulfopolyol, the preparation is a one step process involving reaction of a sulfopolycarboxylic acid or ester with a polyol. In the method of the present invention of the sulfopolyol is prepared in a two step procedure wherein, in the first step, a sulfopolyol is prepared by reaction of a sulfopolycarboxylic acid or ester with a polyol and then, in a second step, this sulfopolyol is chain extended by an esterification reaction with a lower aliphatic lactone.

Articles of the invention which can be films, coatings, or solid elements, preferably exhibit water uptake values of 15 weight percent or less, preferably 12 weight percent or less, as measured by soaking the article in water for 24 hours at 20–25° C.

In this application:

"aliphatic group" means straight chain and branched acyclic and non-aromatic cyclic hydrocarbons having up to 20 carbon atoms;

"alkyl" and "alkylene" groups mean the monovalent and divalent residues remaining after removal of one or two hydrogen atoms, respectively, from a linear or branched hydrocarbon having 1 to 20 carbon atoms;

"aromatic group" means any group having one or more unsaturated carbon rings having 5 to 12 carbon atoms;

"aromatic ester" means an ester group derived from an aryl or arylene carboxylic acid and an aliphatic alcohol;

"aryl" and "arylene" groups mean the residues remaining after the removal of one or two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$;

"arylene or alkylene sulfonic acid group or salt thereof" means a group comprising at least one aromatic or hydrocarbon group substituted by at least one pendant sulfonic acid group or a salt thereof;

"cycloalkyl" and "cycloalkylene" groups mean the monovalent and divalent residues remaining after removal of one or two hydrogen atoms, respectively, from a cyclic hydrocarbon having 3 to 12 carbon atoms;

"electrophilic" refers to a compound, composition, or reagent that forms a bond to its reaction partner by accepting both bonding electrons from that reaction partner;

"group" or "compound" or "polymer" means a chemical species that allows for substitution or which may be substituted by conventional substituents which do not interfere with the desired product; e.g., substituents can be alkyl, alkoxy, aryl, phenyl, cyano, etc.;

"lower aliphatic lactone" means a lactone having 3 to 20 carbon atoms;

"lower alkyl group" means an alkyl group having 1 to 4 carbon atoms;

"molecular weight" means the sum of the atomic weights of all atoms in a group of atoms or in a segment of a polymer and under circumstances where the group or segment may be a mixture of two or more groups or segments is the number average of molecular weights of the groups or segments;

"nucleophilic" refers to a compound, composition, or reagent that forms a bond to its reaction partner by donating both bonding electrons to that reaction partner;

"polymer" includes oligomers;

"random polymer" means like groups can be located at various points along the polymer backbone and not similarly sequenced;

"silyl group" means $Si(Q)_p(OQ)_{3-p}$ where p=0, 1, or 2 wherein each Q independently can be hydrogen or a lower alkyl group having 1 to 4 carbon atoms such that an OQ group in which Q is a lower alkyl group is the hydrolyzable unit;

"sulfo group" or "sulfonate group" or "sulfonic acid group or salt thereof" means a —$SO_3M$ group where M can be H or a cation, preferably an alkali metal ion;

"sulfopolyol" means a symmetric or asymmetric compound or polymer or a random polymer comprising at least one sulfo group, at least two hydroxyl groups, optionally containing other functional groups such as ester, ether, urea, urethane, and thiocarbamate;

"sulfopolyester polyol" or "sulfoester polyol" means a symmetric or asymmetric polymer or a random polymer comprising at least one sulfo group, at least two ester groups, at least two hydroxyl groups, optionally containing other functional groups such as ester, ether, urea, urethane, and thiocarbamate; and "sulfopoly(ester-urethane)" means a symmetric or asymmetric polymer or a random polymer comprising at least one sulfo group, at least two ester groups and at least one urethane group, optionally containing other functional groups such as ether, carbonate, urea, and thiocarbamate.

The presence of an ester containing the sulfonate moiety is useful in the instant polymers because it contributes amorphous character, ductility, and compatibility with coreactants and adjuvants in the composition. In addition, the ester group leads strictly to linear polymers, in contrast to amide, urea, or urethane moieties which can lead to branching via further reaction with isocyanates.

These new materials combine the safety and ease of handling of waterborne paints with the durability of the more expensive, more labor-intensive coatings like epoxies and thermoplastics.

Besides the toughness, weatherability, and abrasion resistance of the polymer films prepared from these silyl terminated sulfopoly(ester-urethane)s, another significant advantage of these new materials is that it is possible to prepare high solids dispersions (e.g., 20 to 70 weight percent solids) in water.

Another advantage of the silyl terminated sulfopoly(ester-urethane)s is that these materials are themselves surfactant molecules, since both hydrophilic and hydrophobic groups or segments can be present in the same molecule. This accounts for the fact that aqueous dispersions of these materials are "self-stabilizing" and there is generally no need to add other surfactant materials or dispersant aids to generate stable dispersions.

A further advantage of these new materials is that bonding to surfaces such as pavement, wood, glass, metal, etc., can be enhanced because of the presence of reactive silyl end groups such as silanol groups.

A still further and unexpected advantage of materials of the present invention is that the water uptake of the polymer films and coatings is reduced when they are prepared according to the method by which the starting sulfopolyol is prepared in the present invention. When the sulfopolyol is prepared in a two step procedure wherein, in the first step, a sulfopolyol is prepared by transesterification of a sulfopolycarboxylic acid or ester with a polyol and then, in a second step, this sulfopolyol is chain extended by an esterification reaction with a lower aliphatic lactone, the resultant sulfopoly(ester-urethane) compositions give rise to polymer films and coatings with greatly reduced water uptakes. This is particularly advantageous for outdoor or high humidity applications of the polymer films or coatings, because water uptake by polymer films or coatings can lead to plasticization or hydrolysis reactions of the polymer films or coatings with resultant degradation of useful properties such as toughness, weatherability, and abrasion resistance.

DETAILED DESCRIPTION OF THE PREFERRED EMBODIMENTS

The present invention provides water-dispersible sulfopoly(ester-urethane) compositions having low water uptake comprising, in their backbone at least one non-terminally disposed arylene or alkylene group comprising a pendant sulfonic acid group or salt thereof, the polymer being terminated by at least one hydrolyzable silyl group.

In a first embodiment, silyl-terminated sulfopoly(ester-urethane)s of the invention having Formula IA, below, are prepared from the reaction of an isocyanate-terminated sulfopoly(ester-urethane) of Formula IIA, below, reacted with a nucleophilic, hydrolyzable silane reagent of Formula III, below, wherein Formula IA can have the structure:

each $R^{1A}$ group independently can be

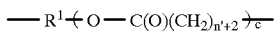

wherein
each $R^1$ independently can be an alkylene or cycloalkylene group such as the residue remaining after the removal of the hydroxyl groups from ethylene glycol, propylene glycol, neopentyl glycol, 2-butyl-2-ethyl-1, 3-propanediol, 1,6-hexanediol, 1,4-cyclohexanedimethanol, diethylene glycol, triethylene glycol, tetraethylene glycol, or hexaethylene glycol, or a polymeric residue having a molecular weight in the range of 100 to 2,000 comprising carbon, hydrogen, and one or both of nitrogen and non-peroxidic oxygen atoms remaining after the removal of the hydroxyl groups from, for example, polyethylene glycol of molecular weight 100–2,000, polypropylene glycol of molecular weight 120–2,000, polycarbonate diols of molecular weight 200–2,000, polyester diols such as polycaprolactone diol of molecular weight 300–2,000, other polyester diols such as those obtained by the reaction of alkylene diols with polymerizable lactones such as valerolactone of molecular weight 300–2,000, polyether diols such as polytetrahydrofuran of molecular weight 100–2,000, or the residue remaining after the removal of the hydroxyl groups from the polyesterification product resulting from reaction of a stoichiometric excess of a polyol with a polycarboxylic acid or the corresponding products resulting from transesterification of polycarboxylic acid lower alkyl esters of molecular weight 100 to 2,000, or the residue remaining after the removal of the hydroxyl groups from the polycondensation product resulting from reaction of a stoichiometric excess of a polyol with a polyisocyanate, the residue having a molecular weight of 100 to 2,000;

each n' independently can be an integer from 0 to 18;
each c independently can be an integer from 1 to 25;
each p independently can be 0, 1, or 2;
each $R^2$ independently can be an alkylene, cycloalkylene, or arylene group such as the residue remaining after removal of the isocyanate groups from polyisocyanates such as hexamethylene diisocyanate, bis(4-isocyanatocyclohexyl)methane, 1,3-bis(isocyanatomethyl)cyclohexane, isophorone diisocyanate, and 1,3-bis(1-isocyanato-1-methylethyl)benzene, or the residue remaining after removal of the isocyanate

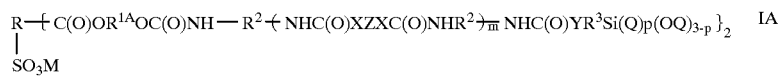

wherein

R can be a trivalent aliphatic or aromatic group in which M is a cation, preferably M is a metal cation such as Na, but M can be H, another alkali metal such as K or Li, or a primary, secondary, tertiary, or quaternary ammonium cation such as ammonium, methylammonium, butylammonium, diethylammonium, triethylammonium, tetraethylammonium, and benzyltrimethylammonium;

groups from isocyanates such as those described in U.S. Pat. Nos. 3,700,643 and 3,600,359, which are incorporated herein by reference, or the residue remaining after removal of the isocyanate groups from isocyanates such as those produced by trimerization reactions of diisocyanates, for example, hexamethylenediisocyanate;

each X independently can be O, S, or $NR^4$, wherein each $R^4$ independently is a lower alkyl group, hydrogen, or an alkylene bridging group to the other X unit, as in a piperazine group, for example;

each Q independently can be hydrogen or a lower alkyl group having 1 to 4 carbon atoms, provided that at least one OQ is an alkoxy group;

each Z independently can be selected from

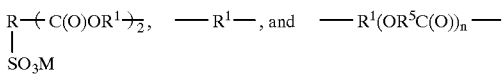

wherein R and $R^1$ are as previously defined, each $R^5$ independently can be an alkylene group;

n can be an integer 1 to 15;

m can be 0 or an integer 1 to 10;

each $R^3$ independently can be an alkylene group having 1 to 10 carbon atoms;

each Y independently can be O, S, or $NR^6$ wherein $R^6$ is a lower alkyl group, hydrogen, or $R^3Si(Q)_p(OQ)_{3-p}$ wherein $R^3$, Q and p are as previously defined.

The isocyanate terminated sulfopoly(ester-urethanes) of Formula IIA

IIA

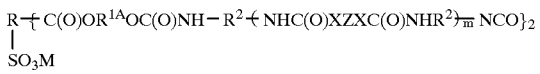

wherein R, M, $R^{1A}$, $R^2$, X, m, and Z are as defined previously, are products of the reaction of a sulfoester polyol and a stoichiometric excess of a polyisocyanate, optionally in the presence of any of other different polyols, polyamines, or polythiols.

In a conventional one step method, sulfoester polyols can be prepared by procedures well known in the art, generally by the reaction of one mole of sulfopolycarboxylic acid, which usually is a sulfoarene- or sulfoalkanedicarboxylic acid (or their corresponding lower alkyl ester) with at least two moles, generally at least three moles, of polyol, generally aliphatic diol, to form the sulfoester diol.

The sulfoester polyols utilized in the present invention, however, can be prepared by a two step method wherein, in the first step, a sulfoester polyol is prepared by reaction of a sulfopolycarboxylic acid or ester with at least two moles, preferably at least three moles, of polyol., preferably aliphatic diol, and then, in a second step, this sulfoester polyol is chain extended by an esterification reaction with a lower aliphatic lactone to form a new sulfoester polyol. The number of moles of lower aliphatic lactone is at least equal to and preferably is equal to at least twice the number of moles of hydroxyl groups present in the sulfoester polyol mixture from the first step. It will be appreciation that if, in the first step of the reaction sequence, the number of moles of polyol is greater than the number of carboxylic acid or ester groups present in the sulfopolycarboxylic acid or ester, the unreacted polyol remaining in the reaction mixture will also be chain extended by reaction with the lactone.

Sulfoarylene- and sulfoalkylenedicarboxylic acids that may be useful for preparation of the sulfocompounds of the invention are any of the known sulfoarene- and sulfoalkanedicarboxylic acids. Examples of these include sulfoalkanedicarboxylic acids such as sulfosuccinic acid, 2-sulfoglutaric acid, 3-sulfoglutaric acid and 2-sulfododecanedioic acid, sulfoarenedicarboxylic acids such as 2-sulfoterephthalic acid, 5-sulfonaphthalene-1,4-dicarboxylic acid, and 5-sulfoisophthalic acid, which is preferred; sulfobenzylmalonic acids such as those described in U.S. Pat. No. 3,821,28 1 and sulfofluorene-dicarboxylic acids such as 9,9-di(2'-carboxyethyl)fluorene-2-sulfonic acid described in British Patent No. 1,006,579; all references are incorporated herein by reference. It is to be understood that the corresponding lower alkyl esters, halides, anhydrides, and salts of the above sulfonic acids can also be used in the preparation.

Aliphatic polyols useful in preparing the sulfocompounds of the invention have a molecular weight of 62 to 2000 and include, for example, monomeric and polymeric polyols preferably having two to four hydroxyl groups. Examples of the monomeric polyols include ethylene glycol, propylene glycol, butylene glycol, hexamethylene glycol, diethylene glycol, 1,1,1 -trimethylolpropane, pentaerythritol, and the like. Examples of polymeric polyols include the polyoxyalkylene polyols, i.e., the diols, triols, and tetrols, the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols and tetrols such as the Carbowax™ polyols available from Union Carbide (Danbury, Conn.), the polyoxytetramethylenediols such as Polymeg™ polyols available from Quaker Oats Company (Chicago, Ill.), the polyester polyols such as the Multron™ poly(ethyleneadipate) polyols available from Bayer Corp. (Pittsburgh, Pa.), the polycarbonate diols such as those available from Stahl USA (Peabody, Mass.), and the polycaprolactone polyols such as the PCP™ polyols available from Union Carbide.

Reaction of the sulfopolycarboxylic acids and polyols generally takes place in the absence of solvent, at an elevated temperature such as 150° to 250° C., and in the presence of titanium, tin, or zinc catalysts. Specific conditions and amounts are exemplified in U.S. Pat. No. 4,558, 149, which is incorporated by reference.

Reaction of the sulfoester polyol and lactone also generally takes place in the absence of solvent at an elevated temperature such as 180° to 250° C., and in the presence of tin or zinc catalysts. Lactones useful for chain extension in the two step method of preparing the sulfoester polyols are lower aliphatic lactones containing 3 to 20 carbon atoms such as propiolactone, butyrolactone, caprolactone, valerolactone, or oxacyclotridecan-2-one.

In another embodiment of the invention, the sulfopoly (ester-urethane)s can comprise alkylene sulfonic acid units in the polymer backbone. Such sulfopoly(ester-urethane)s typically are prepared using methods different from those described for the preparation of sulfopoly(ester-urethane)s comprising aromatic sulfonic acid units described above due to the lower thermal stability of hydroxy terminated dicarboxylic esters of alkyl sulfonic acids. Preferably, they can be prepared, however, by an alternative route involving the Michael addition of a bisulfite salt to an oligomer of an olefinic unsaturated dicarboxylic acid ester. These oligomers can be prepared from esters of olefinic unsaturated dicarboxylic acids using procedures similar to those described above. Subsequent Michael addition of a bisulfite salt to the olefinic unsaturation in the presence of a free radical initiator will produce an oligomer comprising the salt of alkyl sulfonic acid units in the oligomer backbone.

Olefinic dicarboxylic acids suitable for preparing sulfopoly(ester-urethane)s of the present invention include, but are not limited to, maleic acid, fumaric acid, itaconic acid, and unsaturated diol polyfunctional fatty acids (i.e., castor oil, etc.) or triglycerides of ricinoleic acid.

Representative polyisocyanates that can be used to react with the sulfoester polyols to form the isocyanate-terminated sulfopoly(ester-urethane)s are any of the well-known aliphatic and aromatic polyisocyanates. Useful polyisocyanates include hexamethylene diisocyanate, toluene diisocyanate, isophorone diisocyanate, bis(4-isocyanatocyclohexyl)methane (3,5,5-trimethyl- 1 -isocyanato-3-isocyanatomethylcyclohexane), 1,3-bis (isocyanatomethyl)cyclohexane, 1,3-bis(1-isocyanato-1-methylethyl)benzene, 4,4'-diphenylmethane diisocyanate (MDI), 4,4',4"-triisocyanatotriphenylmethane, and the polymethylenepolyphenylisocyanates. Other polyisocyanates are well known and include those described in U.S. Pat. Nos. 3,700,643 and 3,600,359, among many others, which are incorporated herein by reference. Mixtures of polyisocyanates can also be used such as Isonate™ 2143L, available from Dow Chemical Company (Midland, Mich.). The aliphatic polyisocyanates are preferred.

The exact nature and relative amounts of the other polyols which may be incorporated can be varied to change the properties of the final films. Suitable diols comprise those previously mentioned as useful to prepare the sulfocompound and include ethylene glycol, propylene glycol, neopentyl glycol, 2-butyl, 2- ethyl-1,3-propanediol, polypropylene glycol, polyethylene glycol, polyester diols such as polycaprolactone diol, and polyether diols such as polytetramethylenediol and polycarbonate diols such as PC-1122™, PC-1667™, and PC-1733™, available from Stahl USA. Properties that can be varied include ductility, water uptake, tensile strength, modulus, abrasion resistance, minimum film formation temperature, and glass transition temperature. Longer chain polyols tend to provide materials which are more ductile and having lower Tg, whereas shorter chain polyols tend to contribute to high modulus, greater tensile strength, and having high Tg materials. Aliphatic polyols tend to provide materials with decreased water uptake whereas diols containing heteroatoms in the backbone tend to have increased water uptake.

Useful optional polyamines include: ethylenediamine, 1,6-diaminohexane, piperazine, tris(2-aminoethyl)amine, and amine terminated polyethers such as those marketed under the Jeffamine trademark by the Huntsman Corporation (Salt Lake City, Utah). Useful polythiols include 1,2-ethanedithiol, 1,4-butanedithiol, 2,2'-oxytris(ethane thiol), and di- and trimercapto propionate esters of poly (oxyethylene) diols and triols.

The reaction is carried out optionally in a water-soluble (organic) solvent unreactive with an isocyanate such as acetone, methyl ethyl ketone (MEK), tetrahydrofuran, and N-methyl-pyrrolidinone, wherein the solubility in water is at least 10 weight percent. The total concentration of sulfoester-polyol (optionally any of other different polyols, polyamines, or polythiols) and polyisocyanate, is generally desirable to be quite high such as at least 30 weight percent, preferably greater than at least 50 weight percent.

High monomer concentrations and elevated reaction temperatures of from 50° to 80° C. are desirable so that high conversions of monomers to polymer can occur in a reasonable time, e.g., less than eight hours, preferably less than three hours. Catalysts may be employed such as metal salts including dibutyltin dilaurate and dibutyltin diacetate, and amines, such as triethylamine, DBU (1,8-diazabicyclo [5.4.0]undec-7-ene) and DABCO (1,4-diazabicyclo[2.2.2] octane), in useful concentrations of from 0.01 to 1.0 mole percent (relative to the isocyanate reagent).

In this first embodiment, the ratio of polyisocyanate to polyol is adjusted such that the product of this first step of the reaction is an isocyanate terminated sulfopoly(ester-urethane) with a molecular weight of about 1,000 to 25,000. The moles of polyisocyanate preferably exceed the moles of each of sulfopolyester polyol and other polyol, polyamine, or polythiol, the molar excess being preferably from 0.1 to 5, more preferably 0.5 to 2, and most preferably from 0.8 to 1.2.

In the next step of this embodiment, the isocyanate-terminated sulfopoly(ester-urethane)s of Formula IIA, above, are reacted with a nucleophilic, hydrolyzable silane reagent of Formula III, $$HYR^3Si(Q)_p(OQ)_{3-p} \qquad III$$

wherein Y, $R^3$, Q, and p are as previously defined.

Useful nucleophilic, hydrolyzable silane reagents include 3-aminopropyltriethoxysilane, 3-N-methylaminopropyltrimethoxy silane, 3-mercaptopropyltrimethoxy silane, 3-hydroxypropyltriethoxysilane, and bis(3-triethoxysilyl propyl)amine. Reaction conditions are generally the same as those employed in the synthesis of the isocyanate-terminated sulfopoly(ester-urethane)s mentioned above, with the reaction period being extended from 0.5 to 2 hours.

In yet another aspect of this embodiment, compositions of Formula IIA may be reacted with a polyfunctional nucleophile such as water or a polyamine in less than stoichiometric amount relative to isocyanate, preferably less than 20 percent of stoichiometry, more preferably less than 5 percent of stoichiometry. This practice results in higher molecular weight isocyanate-terminated compositions. Because of multiple possibilities for polymer extensions and branching in these reactions, structural depiction is complex and cannot be reduced to a simple formula. These products, however, are useful and are deemed to fall within the scope of the present invention. The extended and branched polymers have formulae related to Formulae IA and IVA.

In a third step of this embodiment, water is added to convert the hydrolyzable silyl groups to silanol groups. This reaction is conveniently accomplished by adding to the silyl-terminated sulfopoly(ester-urethane) at least stoichiometric water, preferably sufficient water to form a polymer dispersion. If an organic solvent having a boiling point lower than 100° C. has been employed in the synthetic sequence thus far, the organic solvent may be evaporatively removed to leave an essentially aqueous polymer dispersion of the silanol-terminated sulfopoly(ester-urethane). The weight percent of polymer in the final aqueous dispersion is at least 20 percent, preferably at least 30 percent, and more preferably at least 50 percent. Conversely, when an organic solvent is used which has a boiling point greater than 100° C., the reaction sequence is conducted in as concentrated solution as possible, e.g., preferably equal to or less than 20 weight percent solvent. The resultant concentrated solution containing the silyl terminated sulfopoly(ester-urethane) can be effectively dispersed in water using microfluidization techniques.

Microfluidization is a process for making stable uniform sub-micron dispersions, including dispersions of sulfopoly (ester-urethane)s. The process uses high pressure liquid jet milling to combine water dispersible polymer solutions into water. The polymer solutions generally have a viscosity in the range of 1 to 500,000 centipoises. In this process the solution of the polymer in organic solvent can be injected into a water stream and then subjected to high pressure of 0.6 to 300 MPa (100–40,000 psi) liquid jet milling in interaction chambers. The interaction chambers which provide a high shear zone are generally configured to be explosive expansion chambers, or use high velocity impinging streams, or contain a series of orifices in series having decreasing diameters. In this process, all of the liquid is forced through the interaction chamber configurations providing uniform shear for all the material. This process provides the opportunity to make colloidal dispersions with lower VOC levels, and/or it can make particles with smaller size distributions than are produced by other processes.

Reaction Sequence 1A, below, shows the steps for preparing compositions of Formulae IA, IIA, and the hydrolysis product of IA which is designated IA'. For simplicity, the reaction sequence and those that follow depict preparation and reaction of a sulfopolyester diol but is meant to include sulfopolyester polyols with more than 2 hydroxyl groups.

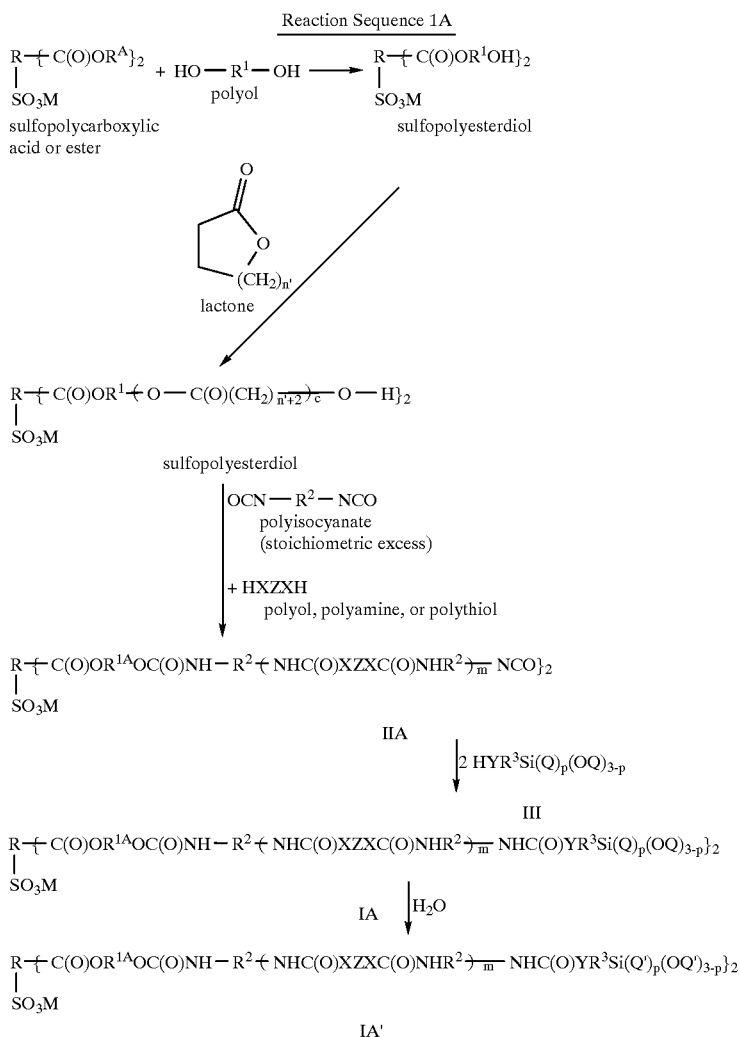

wherein $R^A$ independently can be hydrogen or a lower alkyl group, and R, M, $R^1$, $R^2$, $R^3$, X, Y, Z, m, Q, and p, c, n', and $R^{1A}$ can be as previously defined, and each Q' independently can be hydrogen or a lower alkyl group having one to four carbon atoms, provided that at least one OQ' is a hydroxyl group.

In a second embodiment of the invention, silyl-terminated sulfopoly(ester-urethane)s of Formula IVA of the invention are prepared by reaction of a hydroxy-, amine-, or thiol-terminated sulfopoly(ester-urethane) of Formula VA with an electrophilic, hydrolyzable silane reagent of Formulae VIa, VIb, or VIc wherein Formula IVA can have the structure:

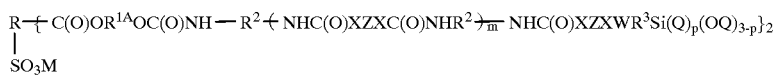

wherein R, $R^{1A}$ $R^2$, $R^3$, M, Q, X, Z, p, and m are as previously defined, and each W independently can be

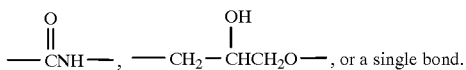, or a single bond.

In this second embodiment of the invention, the hydroxy-terminated sulfo-poly(ester-urethane)s are preferred and are easily obtained by adjusting the stoichiometry of the polyol/polyisocyanate ratio in the first step of the reaction sequence as is described above in the first embodiment such that moles of sulfopolyester polyol, other polyol, polyamine, or polythiol, exceed those of polyisocyanate, the molar excess being preferably from 0.1 to 5, more preferably from 0.5 to 2, and most preferably from 0.8 to 1.2. The product of this reaction is the composition of Formula VA:

|
SO₃M wherein R, $R^{1A}$, $R^2$, M, X, Z, and m are as previously defined. When the invention is practiced in this embodiment, the compositions of Formula VA are reacted in a subsequent step with an electrophilic, hydrolyzable silane reagent having any of Formulae VIa, VIb, and VIc:

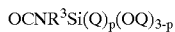  VIa

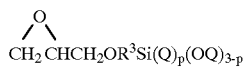  VIb $ClR^3Si(Q)_p(OQ)_{3-p}$  VIc wherein $R^3$, Q, and p are as previously defined.

Useful electrophilic, hydrolyzable silane reagents include 3-isocyanatopropyltriethoxy silane, 3-glycidoxypropyltrimethoxysilane, chloropropyltriethoxysilane.

For the practice of this second embodiment, reactants, reaction conditions, catalysts, and procedures are virtually the same as those specified with the first embodiment of the invention.

Reaction Sequence 2A, below, shows the steps for preparing compositions of Formulae IVA, VA, and the hydrolysis product of IVA which is designated IVA'.

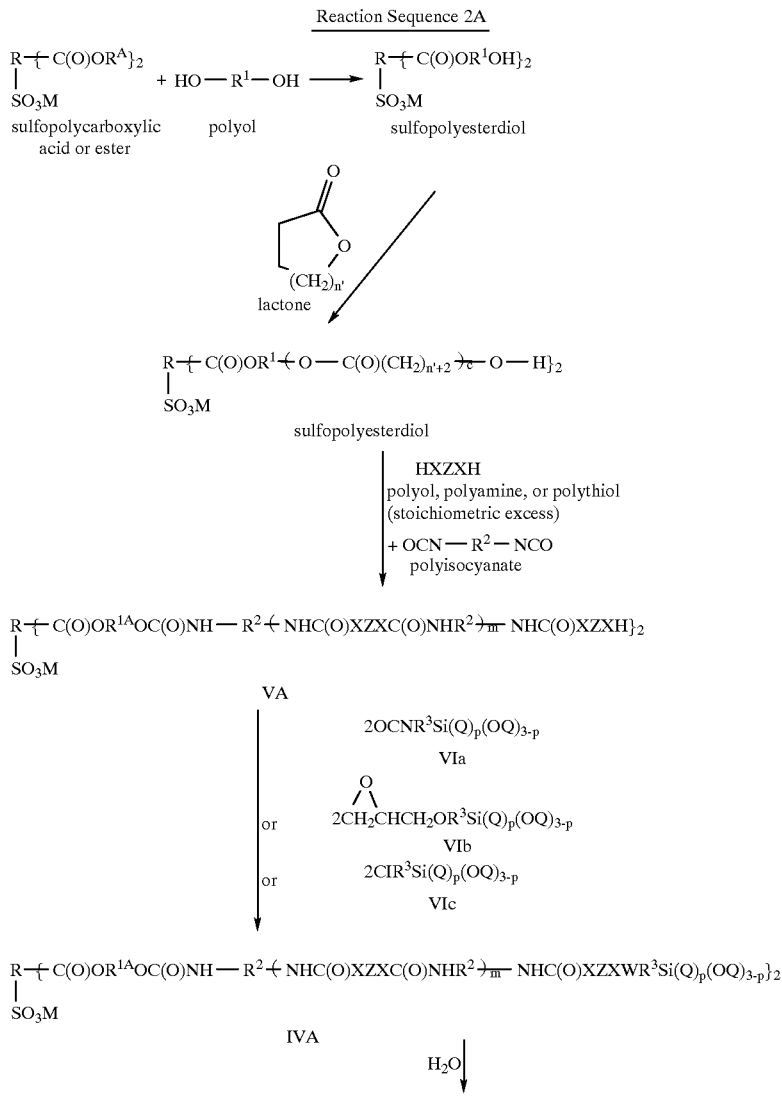

-continued

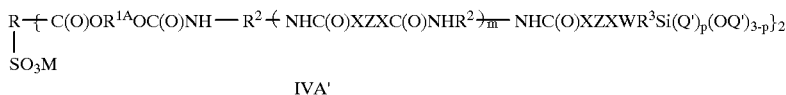

IVA' wherein in Sequence 2A, R, $R^A$, $R^1$, $R^{1A}$ $R^2$, $R^3$, M, X, Y, Z, Q, Q', W, m, c, n', and p are as previously defined.

The silyl terminated sulfopoly(ester-urethane)s of the invention can be used as such to provide tough, transparent coatings. In a preferred embodiment, for use as a pavement marking material, in order to enhance the daytime and nighttime appearance of the pavement marking, various pigments, fillers or extenders, and other adjuvants can be added. These pigments, fillers, and other adjuvants are added both for economic reasons and for obtaining desirable processing and physical properties of the final coatings, such as reflectivity, viscosity, stability, color, hardness, and durability. Pigment and adjuvants can be added in an amount sufficient to provide the desired color density and other characteristics.

To produce a white pavement marking composition, a pigment such as titanium dioxide, for example, Ti-Pure™ R-706, Ti-Pure™ R-960 (both available from DuPont, Wilmington, Del.), Kronos 2160™ or Kronos 2310™ (both available from Kronos, Inc., Houston, Tex.) can be added. To produce a yellow pavement marking composition, yellow pigments such as Hansa™ Yellow 65 or 75 (available from American Hoechst Corp., Somerville, N.J.) can be added. Pigments typically comprise 0 to 300 weight percent relative to the sulfopoly(ester-urethane).

Calcium carbonate is a common filler or extender that is used to provide body to the composition and to lower the cost. Useful types of calcium carbonate include, for example, Omyacarb™ 5 (available from OMYA, Inc. Proctor, Vt.) or various grades of calcium carbonate such as those available under the Hubercarb™ trademark from the J. M. Huber Corp., St. Louis, Mo. Other fillers include talcs such as those available under the Nytal™ trademark from the R. T. Vanderbilt Co., Norwalk, Conn., clays such as those available under the Huber™ or Polyplat™ trademarks from the J. M. Huber Corp., silicas such as Aerosil™ 200 and other silicas available under the Aerosil™ trademark from the Degussa Corp., Ridgefield Park, N.J. Other useful fillers or extenders which may be incorporated into the pavement marking compositions include alumina, aluminum silicates, magnesium carbonate, calcium sulfate, and zinc oxide. Examples of aluminum silicates include those available from the Feldspar Corporation, Spruce Pine, N.C., under the Felex™ trademark and from Unimin, New Canaan, Conn., under the Minex™ trademark. Fillers typically comprise 0 to 300 weight percent relative to the sulfopoly(ester-urethane).

These pigments and fillers can be incorporated into the aqueous pavement marking compositions by utilizing conventional dispersion techniques and equipment, for example, three roll mills, ball mills, bead mills, sand mills, high speed disc dispersers, and high speed impingement mills. Other adjuvants which can be combined with the silyl terminated poly(ester-urethane) compositions include dispersants such as Tamol™ 901 (available from Rohm and Haas Co., Philadelphia, Pa.), wetting aids or surfactants such as Surfynol™ CT-136 (available from Air Products and Chemicals, Inc., Allentown, Pa.) or Triton™ CF 10 (available from Union Carbide, Danbury, Conn.), defoamers such as Drewplus™ L-493 (available from Ashland Chemical Co., Boonton, N.J.), thixotropes or viscosity control agents such as Natrosol™ 250HR, HBR, and Plus Grade 430 thickeners (available from the Aqualon Co., Wilmington, Del.), coalescents such as 1-methyl-2-pyrrolidinone (NMP) or Texanol™ (available from Eastman Chemical Co., Kingsport, Tenn.), preservatives such as Kathon™ LX (available from Rohm and Haas) and freezing point depressants such as methanol, ethanol, or mixtures of these alcohols with propylene glycol. Effective quantities of the adjuvants preferably are less than 5 weight percent of the sulfopoly(ester-urethane).

To enhance visibility of the pavement marking, especially under low light conditions, it is advantageous to incorporate optical elements. The optical elements preferably consist of inorganic materials which are not readily susceptible to abrasion. Suitable optical elements include microspheres formed of glass, preferably having indices of refraction of from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability are taught in U.S. Pat. No. 4,367,919 which is incorporated herein by reference.

Particularly useful optical elements, because of their durability and refractive index, are microcrystalline ceramic optical elements. Preferred ceramic optical elements are disclosed in U.S. Pat. Nos. 4,564,556 and 4,758,469 which are incorporated herein by reference. These optical elements are described as solid, transparent, nonvitreous, ceramic spheroids comprising at least one crystalline phase containing at least one metal oxide. The ceramic spheroids also may have an amorphous phase such as silica. The term "nonvitreous" means that the spheroids have not been derived from a melt or mixture of raw materials capable of being brought to a liquid state at high temperatures, like glass. The spheroids are resistant to scratching and chipping, are relatively hard (above 700 Knoop hardness), and are made to have a relatively high index of refraction. These optical elements may comprise zirconia-alumina-silica or zirconia-silica.

Anti-skid particles can be incorporated into the compositions of the invention in an amount suitable for its intended purpose. Typically skid-resistant particles do not play a role in retroreflectivity; rather they are disposed on retroreflective and non-retroreflective pavement markings to improve dynamic friction between the marking and the vehicle tire. The skid-resistant particles can be, for example, ceramics such as quartz or aluminum oxide or similar abrasive media. Preferred skid-resistant particles include fired ceramic spheroids having a high alumina content as taught in U.S. Pat. Nos. 4,937,127, 5,053,253, 5,094,902, and 5,124,178, the disclosures of which are incorporated herein by reference. The particles are preferred because they do not shatter upon impact like crystalline abrasive media such as $Al_2O_3$ and quartz. Skid-resistant particles typically have sizes of about 200 to about 800 micrometers.

The silanol terminated sulfopoly(ester-urethane) compositions of the invention crosslink through the reaction of the terminal silanol groups to form Si—O—Si bonds with the elimination of a molecule of water. By the method described herein, it is possible that no volatile organic compounds (VOCs) are present before or after the oligomers are cured to form the crosslinked polymer films.

An additional advantage of these silanol terminated poly (ester-urethane) compositions is that they are themselves surfactant molecules, since both hydrophilic and hydrophobic groups or sections are present in the same molecule. Consequently, the aqueous dispersions of these materials are "self-stabilizing" and there is no need to add other surfactant materials or dispersant aids to generate stable dispersions.

Objects and advantages of this invention are further illustrated by the following reaction sequences and examples, but the particular materials and amounts thereof recited in these examples, as well as other conditions and details, should not be construed to unduly limit this invention.

The following reaction sequence and typical experimental procedures will serve to clarify the synthesis of the silyl terminated poly(ester-urethane) compositions of the instant invention. "Me" means methyl and "Bu" means butyl. Preparation of the sulfonated diol PCPSSIP shown below is described in greater detail in U.S. Pat. No. 4,558,149, incorporated herein by reference.

The following procedure teaches the preparation of the sulfopolyester polyols precursor by the one-step method. Preparation of PCPSSIP Precursor (comparative)

A mixture of dimethyl 5-sodiosulfoisophthalate (DMSSIP, 25.1 kg, 85 mol, available from E.I. DuPont de Nemours, Wilmington, Del.), polycaprolactonediol (PCP 0200, average molecular weight 514, 131 kg, 255 mol, available from Union Carbide Corp., Danbury, Conn.), and tetrabutyl titanate (78 g, 0.23 mol, available from Aldrich Chemical Co., Milwaukee, Wis.) was heated at 230° C. for four hours and the methanol by-product of the reaction was distilled from the reaction. After cooling to ambient temperature, an oily product comprising an approximately equal molar mixture of PCPSSIP and unreacted PCP 0200 was obtained. Reaction Sequence 3 shows the chemical equations involved.

The mixed PCPSSIP Precursor had a nominal hydroxy equivalent weight of about 500 g/mole (generally in the range of 450 to 600 g/mole). The hydroxy equivalent weight for the mixed precursor can vary depending on reaction conditions (e.g., temperature, rate of methanol removal, catalyst, etc.). The hydroxyl equivalent weights were determined by NMR analysis and adjusted to a preferred value for the preparation of pavement marking compositions of the present invention of approximately 475 with the addition of diethylene glycol.

In the following examples, "PCPSSIP precursor" means the mixture of PCPSSIP and PCP 0200. Unless otherwise noted, the molar ratio of PCPSSIP to PCP 0200 is approximately 1.0, and "b mole" of PCPSSIP precursor means approximately b/2 mole each of PCPSSIP and PCP 0200. In Examples 2, 16, and 19, the PCPSSIP precursor was prepared, as shown in Reaction Sequence 3, below, using zinc acetate (0.24 wt % based on diol charge) instead of tetrabutyl titanate.

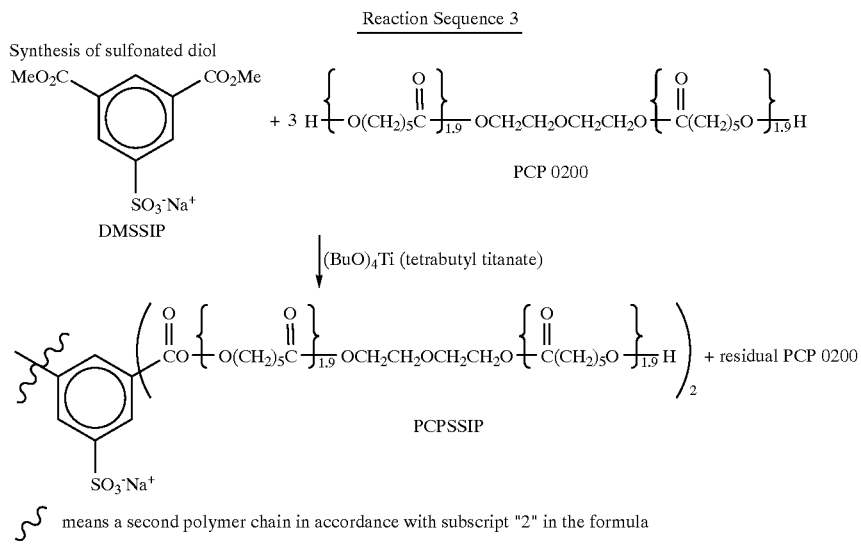

In all structures in this application, including those shown for PCP 0200 and PCPSSIP, the numbers outside the brackets refer to the average number of units.

In the Examples, the glass transition temperatures are reported as the midpoint of the change in specific heat over the transition range using an average sample heating rate of 5° C./min. The tensile properties were obtained from sample specimens with gauge lengths of 1.43 cm (0.562 inches) and strain rates of 2.54 cm/min. (1 in./min.). Water uptake is in weight percent comparing the increase in weight to the weight of the article prior to immersion in water for 24 hours.

Objects and advantages of this invention are further illustrated by the following examples, but the particular materials and amounts thereof recited in these examples, as well as other conditions and details, should not be construed to unduly limit this invention.

Pigment and adjuvants can be added in an amount sufficient to provide the desired color density and other characteristics.

Examples 1–27, relate to the synthesis and processing of silyl terminated sulfo(polyester-urethanes) that were prepared from sulfopolyester polyols produced in a conventional one step method and are designated comparative.

EXAMPLE 1 (comparative)

The mixed PCPSSIP precursor prepared as described above except as a 1 to 0.87 molar mixture of PCPSSIP and PCP 0200 (649.8 g, 0.64 mol based on a hydroxyl equivalent weight of 509 for the mixture), additional PCP 0200 (599.4 g, 1.16 mol), ethylene glycol (89.4 g, 1.44 mol, available from J. T. Baker, Inc., Phillipsburg, N.J.), and methyl ethyl ketone (1338 mL) was heated to 85° C. and dried azeotropically by distilling methyl ethyl ketone (445 mL) from the mixture. After cooling to ambient temperature, dibutyltin dilaurate (1.53 g, 2.4 mmol, available from Alfa Chemical Co., Ward Hill, Mass.) was added to the dried solution. The dried solution was added, with stirring, to a solution of isophorone diisocyanate (800.2 g, 3.60 mol, available from Huls America, Inc. Piscataway, N.J.) in methyl ethyl ketone (533 mL), which had been heated to 72° C., at such a rate that the temperature of the reaction mixture did not exceed 85° C. After 1 hour, additional dibutyltin dilaurate (1.53 g) in methyl ethyl ketone (50 ml) was added to the solution, and the reaction mixture was maintained at 80° C., with stirring, for an additional 3.5 hours. A solution of 3-aminopropyltriethoxysilane (159.4 g, 0.72 mol, available from Aldrich Chemical Co.) in methyl ethyl ketone (100 mL) was then added to the reaction mixture which was maintained at 80° C., with stirring, for an additional 45 minutes. Water (2 L), at 80° C., was added to the reaction mixture over about a one-hour period with vigorous stirring and methyl ethyl ketone was subsequently distilled from the mixture under reduced pressure to produce a dispersion (54% solids) of a silanol terminated sulfopoly(ester-urethane) in water. Modulated Differential Scanning Calorimetry (MDSC) and tensile properties analyses made of a spun cast film of the dispersion indicated that the polymer had a Tg of 26° C. and a tensile strength of 17.9 MPa (2595 psi) at 587% elongation.

EXAMPLE 2 (comparative)

A silanol terminated sulfopoly(ester-urethane) was prepared substantially according to the procedure of Example 1 except that the reactants were charged as follows:

The mixed PCPSSIP precursor (37.6 g, 0.04 mol), PCP 0201 (52.4 g, 0.10 mol) (polycaprolactone diol, available from Union Carbide), ethylene glycol (7.44 g, 0.12 mol), and isophorone diisocyanate (62.2 g, 0.28 mol). The molar ratio of the reactants was 1:6:6:14. Modulated Differential Scanning Calorimetry (MDSC) and tensile properties analyses made of a spun cast film of the polymer produced by this reaction sequence indicated that the polymer had a Tg of 17° C. and a tensile strength of 30.6 MPa at 653% elongation.

In this Example and in Examples 3–5, the molar ratio relates to PCPSSIP, PCP, ethylene glycol, and diisocyanate, respectively.

In Examples 3–5, below, the isocyanate utilized was bis(4-isocyanato-hexyl)methane.

EXAMPLE 3 (comparative)

A silanol terminated sulfopoly(ester-urethane) was prepared substantially according to the procedure of Example 1 except that the reactants were charged as follows:

The mixed PCPSSIP precursor (53.3 g, 0.06 mol), PCP 0201 (47.7 g, 0.09 mol), and ethylene glycol (3.7 g, 0.06 mol), and bis(4-isocyanatocyclo-hexyl)methane (62.9 g, 0.24 mol, $H_{12}$MDI, available from Bayer Corp., Pittsburgh, Pa.). The molar ratio of the reactants was 1:4:2:8. Modulated Differential Scanning Calorimetry (MDSC) and tensile properties analyses made of a spun cast film of the polymer produced by this reaction sequence indicated that the polymer had a Tg of 14° C. and a tensile strength of 14.7 MPa at 502% elongation.

EXAMPLE 4 (comparative)

A silanol terminated sulfopoly(ester-urethane) was prepared substantially according to the procedure of Example 1 except that the reactants were charged as follows:

The mixed PCPSSIP precursor (56.9 g, 0.06 mol), PCP 0201 (63.6, 0.12 mol) and ethylene glycol (9.3 g, 0.15 mol) and bis(4-isocyanatocyclohexyl)methane (94.3 g, 0.36 mol). The molar ratio of the reactants was 1:5:5:12. Modulated Differential Scanning Calorimetry (MDSC) and tensile properties analyses made of a spun cast film of the polymer produced by this reaction sequence indicated that the polymer had a Tg of 36° C. and a tensile strength of 17.4 MPa at 390% elongation.

EXAMPLE 5 (comparative)

A silanol terminated sulfopoly(ester-urethane) was prepared substantially according to the procedure of Example 1 except that the reactants were charged as follows:

The mixed PCPSSIP precursor (53.3 g, 0.06 mol), PCP 0201 (15.9 g, 0.03 mol), ethylene glycol (7.45 g, 0.12 mol), and bis(4-isocyanatocyclohexyl)methane (62.9 g, 0.24 mol). The molar ratio of the reactants was 1:2:4:8. Modulated Differential Scanning Calorimetry (MDSC) and tensile properties analyses made of a spun cast film of the polymer produced by this reaction sequence indicated that the polymer had a Tg of 80° C. and a tensile strength of 18.2 MPa at 111% elongation.

Examples 6–10 (comparative)

These examples were prepared in an analogous manner to that described above for Example 1. In Examples 6 to 9, bis(4-isocyanatocyclohexyl)methane (also known as $H_2$MDI, available from Bayer Corp., Pittsburgh, Pa.) was substituted for isophorone diisocyanate. Properties of the polymer films cast from these examples are shown in Table I below. Pigments and adjuvants can be added in an amount sufficient to provide the desired color density and other characteristics. The data indicates that formulations of Examples 2 and 6 were particularly desirable as components of pavement marking paints.

COMPARATIVE EXAMPLES (11–14)
(comparative)

Film properties of some commercially available pavement marking paints and a two-part epoxy are shown below in Table I for comparison. It will be recognized that tensile strengths, elongation, and abrasion resistance of polymer films prepared from the silanol terminated sulfopoly(ester-urethane) compositions can exceed those of the comparative materials.

TABLE I

| Comparative Examples | Sample | Tg (° C.) | Peak stress MPa | % Elon. @ break | Taber Data (weight loss, g)[b] |
|---|---|---|---|---|---|
| | PCPSSIP:PCP:EG[a] | | | | |
| 6 | 1:5:5 | 14 | 25.80 | 648 | |
| 7 | 1:5:1 | 0 | 4.40 | 241 | |
| 8 | 1:4:4 | 34 | 15.5 | 365 | 0.0199 |
| 9 | 1:3:3 | 38 | 12.9 | 330 | |
| 10 | 1:1 blend of Examples 5 and 7 | 0/80 | 9.36 | 360 | |

TABLE I-continued

| Comparative Examples | Sample | Tg (° C.) | Peak stress MPa | % Elon. @ break | Taber Data (weight loss, g)[b] |
|---|---|---|---|---|---|
| Comparative Examples (commercial paints) | | | | | |
| 11 | Comparative white paint | 21 | 1.59 | 399 | 0.1064 |
| 12 | Comparative yellow paint | 9 | 2.25 | 782 | 0.1588 |
| 13 | Comparative solvent based white paint | 34 | 9.68 | 3 | 0.0638 |
| 14 | Comparative epoxy | 32/45 | 14.90 | 108 | 0.0271 |

[a]Relative ratios of PCPSSIP to PCP to ethylene glycol; relative amount of diisocyanate used was the sum of these three numbers plus one, i.e., in Example 6, 12 parts of $H_{12}$MDI were used.
[b]Taber abraser test method is ASTM C501-84.

EXAMPLE 15 (comparative)

This Example teaches preparation of sulfopoly(ester-urethane)s of the second embodiment of the invention by first preparing a hydroxyl terminated sulfopoly(ester-urethane), reaction of this hydroxyl terminated sulfopoly(ester-urethane) with an electrophilic alkoxy silane reagent, and reaction of the alkoxy silane terminated sulfopoly(ester-urethane) with water.

The mixed PCPSSIP precursor (57.33 g, 0.06 mol, with a hydroxy equivalent weight of 475), PCP 0201 (62.76 g, 0.12 mol, available from Union Carbide Corp.), ethylene glycol (9.32 g, 0.15 mol) and dibutyltin dilaurate (0.16 g, 0.25 mmol) in methyl ethyl ketone (85 mL) was heated to 80° C. and a solution of isophorone diisocyanate (66.69 g, 0.3 mol) in methyl ethyl ketone (44 mL) added to the mixture, with stirring, at a rate such that the reaction temperature did not exceed 80° C. Approximately 30 minutes subsequent to the completion of the addition of the isophorone diisocyanate solution, dibutyltin dilaurate (0.16 g) in methyl ethyl ketone (1 mL) was added to the reaction mixture and the reaction maintained at 80° C., with stirring, for an additional 3.5 hours. A solution of isocyanatopropyltriethoxy silane (14.82 g, 0.06 mol, available from Huls America, Inc.) in methyl ethyl ketone (5 mL) was added to the reaction mixture and the mixture maintained at 80° C., with stirring, for approximately one hour. (Infrared analysis (2250 cm$^{-1}$) of the reaction mixture at this point indicated no residual isocyanate remained.) Water (260 mL) was added to the reaction mixture, with stirring, over a period of approximately ten minutes and the methyl ethyl ketone was distilled from the mixture under reduced pressure to produce a dispersion of a silanol terminated sulfopoly(ester-urethane). Modulated Differential Scanning Calorimetry (MDSC) and tensile properties analyses made of a spun cast film of the polymer produced by this reaction sequence indicated that the polymer had a Tg of 7° C. and a tensile strength of 17.9 MPa at 295% elongation.

EXAMPLE 16 (comparative)

Dispersion of various pigments, fillers, and adjuvants were accomplished as follows: A sulfopoly(ester-urethane) prepared analogously to composition of Example 2 (177 g of a 50% solids dispersion in water) was added to a 600 mL stainless steel beaker. The beaker was mounted on a Premier Mill Model 90™ high speed dispersator (available from Premier Mill Co., Reading, Pa.) and mixing was begun with a 2.5 cm high shear head at 500 RPM. Tamol™ 681 dispersant (2.58 g, available from Rohm and Haas, Philadelphia, Pa.), Bentolite ™ WH rheological modifier (0.66 g of a 15% solution in water, available from Southern Clay, Gonzales, Tex.), Surfonyl™ CT-136 surfactant (0.85 g, available from Air Products and Chemicals, Inc., Allentown, Pa.), and Drewplus™ L-493 defoamer (0.82 g, available from Ashland Chemical Co., Boonton, N.J.) were added. Titanium dioxide (Ti-Pure™ R-706, 39.27 g, available from DuPont, Wilmington, Del.) and calcium carbonate (Omyacarb™ 5, 138.04 g, available from OMYA, Inc., Proctor, Vt.) were then added. This mixture was stirred at 4800 RPM for 15 minutes, then the stirring speed was reduced to 500 RPM and the mixture was diluted with water (10 g), methanol (7.9 g), and N-methylpyrolidinone (8.79 g). Drewplus™ L-493 (0.99 g) and Natrosol™ HBR250 thickener (1.25 g of a 2.5% solution in water, available from Aqualon Co., Wilmington, Del.) were then added to yield a composition useful for pavement marking.

EXAMPLE 17 (comparative)

This Example teaches the preparation of a sulfopoly(ester-urethane) in 1-methyl-2-pyrrolidinone (NMP).

A solution of the mixed PCPSSIP precursor (95.0 g, 0.1 mol), PCP 0201 (78.6 g, 0.15 mol), ethylene glycol (12.4 g, 0.20 mol), dibutyltin dilaurate (0.16 g, 0.00025 mol), and NMP (57.7 g) was prepared by heating the reagents together at 60° C. This solution was added to isophorone diisocyanate (111 g, 0.50 mol) contained in a 1000 mL flask at such a rate that the temperature was maintained between 70° C. and 75° C. Five minutes after the end of the addition another 0.16 g of dibutyltin dilaurate was added and the temperature was maintained between 77° C. and 86° C. for another 40 minutes. Then a solution of 3-aminopropyltriethoxysilane (22.1 g, 0.10 mol) in 22.1 g of NMP was added in a stream. The addition caused an immediate exotherm to 94° C. Stirring was continued for another hour while the temperature was maintained between 85° C. and 95° C., then the reaction mixture was transferred to a wide mouth glass jar, the jar was sealed, and the product was allowed to cool to room temperature.

EXAMPLE 18 (comparative)

This Example teaches the microfluidization of the reaction product of Example 17 into water.

The apparatus providing the high pressure liquid jet milling in this example was a Microfluidizer™ Model M110F (Microfluidics, Newton, Mass.) equipped with a 400 μm expansion chamber and a 200 μm expansion chamber in series. The maximum pressure reached was 55 MPa (8000 psi). The microfluidizer in this configuration had a flow rate of 600 mL/min. The average particle sizes of the polymer dispersions were determined by dynamic light scattering using a Malvern PCS 4700 (Malvern, Southborough, Mass.).

NMP solution (95.3 g) of the sulfopoly(ester-urethane) of Example 18 was preheated to 80° C. and loaded into a caulking gun. Then, 240 g of deionized distilled water (85° C.) was circulated through the microfluidizer at 55 MPa (8000 psi). The NMP solution was injected steadily into the water stream, just before the high pressure pump, over a 10 minute period (9.53 g/min). The high shear and intimate mixing provided in the chambers caused a colloidal dispersion of the sulfopoly(ester-urethane) particles to form immediately after the sulfopoly(ester- urethane) and water exited from the interaction chambers. The dispersion was allowed to circulate through the microfluidizer as the solids content built to its final value of 28 wt % sulfopoly(ester-urethane)

and NMP (approximately 17 total passes). The particle size of this dispersion was determined to be 93 nm and was constant over the time of the experiment. In addition, the dispersion contained no undispersed sulfopoly(ester-urethane) or settled material. By contrast, a dispersion prepared by mixing 20 g of an 80% solution of the sulfopoly (ester-urethane) of Example 18 in NMP (80° C.) with 240 g preheated water (85° C.) using a high speed dispersator and a Cowles blade (3000 RPM) for 15 minutes resulted in a poor dispersion. The dispersion contained undispersed sulfopoly(ester-urethane) which quickly settled to the bottom of the container. The sulfopoly(ester-urethane) particles that did form a dispersion had an average particle size of 176 nm. This example showed the applicability of using high pressure liquid jet milling to disperse the sulfopoly(ester-urethane) into water to form a stable waterborne dispersion with better properties than standard high shear mixing.

EXAMPLE 19–27 (comparative)

The following samples were prepared substantially according to the procedure of Example 1 (one-step method) and the water uptakes of the spun cast films of the polymers obtained were measured by immersing samples (about 0.5 g) of the film for 24 hours in tap water and/or deionized (DI) water at room temperature. The films were then removed, blotted dry, and weighed to determine water uptake. Data for these samples is shown in Table II below:

TABLE II

| Comparative Examples | Sample[a] | Water Uptake in DI Water, % |
|---|---|---|
| 19 | 1:5:5(IPDI) | 21 |
| 20 | 1:4:2($H_{12}$MDI) | 35 |
| 21 | 1:4:4(IPDI) | 16 |
| 22 | 1:4:4(IPDI)[b] | 26 |
| 23 | 1:6:6(IPDI) | 22 |
| 24 | 1:6:6(IPDI)[c] | 11 |
| 25 | 1:4:6(IPDI) | 18 |
| 26 | 1:3:7(IPDI) | 17 |
| 27 | 1:5:7(IPDI) | 15 |

[a]Relative molar ratios of PCPSSIP to PCP to ethylene glycol or other diol; relative amount of diisocyanate used was the sum of these numbers plus one.
[b]Neopentyl glycol was substituted for ethylene glycol in this example.
[c]1,6-Hexanediol was substituted for ethylene glycol in this example.

EXAMPLE 28

This Example teaches the preparation and reaction of a sulfonated polyester diol other than PCPSSIP.
A mixture of DMSSIP (74.0 g, 0.25 mol), 1,4-cyclohexanedimethanol (180 g, 1.25 mol, available from Aldrich Chemical Co.), and tetrabutyl titanate (0.1 g, 0.3 mmol) was heated to 200° C. and maintained at that temperature, with stirring, for four hours, and then cooled to 150° C. where it was maintained, with stirring, for an additional five hours. The temperature of the reaction mixture was then increased to 180° C. and ε-caprolactone (228 g, 2.0 mol, available from Aldrich Chemical Co.) containing dibutyltin dilaurate (0.2 g, 0.3 mmol) was added to the reaction mixture, with stirring, over a period of 30 minutes. The mixture was maintained at 180° C., with stirring, for three hours and then cooled to room temperature, to produce an oily precursor composition comprising a 1:3 molar ratio of a sulfonated diol and a diol resulting from the reaction of 1,4-cyclohexanedimethanol (1 part) with ε-caprolactone (2 parts). The thus prepared precursor was converted to a silanol terminated sulfopoly(ester-urethane) substantially according to the procedure of Example 1 by reacting 55.9 g of the precursor with PCP 0201 (62.9 g, 0.12 mol), ethylene glycol (5.58 g, 0.09 mol), isophorone diisocyanate (79.9 g, 0.36 mol) followed by reaction with aminopropyltriethoxy silane (11.7 g, 0.053 mol). Modulated Differential Scanning Calorimetry (MDSC) and tensile properties analyses made of a spun cast film of the polymer produced by this reaction sequence indicated that the polymer had a Tg of 29° C. and a tensile strength of 28.6 MPa at 341% elongation.

EXAMPLE 29

This Example teaches the preparation of a different sulfopolyester polyol precursor by a two-step, chain extension method.

A mixture of dimethyl 5-sodiosulfoisophthalate (DMSSIP, 337.3 g, 1.14 mol), diethylene glycol (DEG, 483 g, 4.55 mol, available from Aldrich Chemical Co., Milwaukee, Wis.), and zinc acetate, (0.0.822 g, available from Aldrich) was heated to 180° C. and the methanol by-product was distilled from the reaction mixture. After 4.5 hours NMR analysis of the reaction product showed that less than 1% residual methyl ester was present in the product.

Dibutyltin dilaurate (1.51 g, 2.4 mmol) was added to the above reaction product, the temperature held at 180° C., and epsilon-caprolactone (1753 g, 15.36 mol, available from Aldrich) was added portion-wise over about a 30 minute period. When addition was complete, the reaction mixture was held at 180° C. for 4 hours. The product is designated a "2:8:27" sulfopolyester polyols, since the ratios of the amounts of DMSSIP:DEG:caprolactone was 2:8:27.

Determination of the hydroxyl equivalent weight of the reaction product was as follows. A 5.12 g sample of the product mixture was dissolved in 20 mL of methyl ethyl ketone, isophorone disocyanate (2.04 g, 9.18 mmol, available from Aldrich), and dibutyltin dilaurate (0.02 g) added, and the solution heated 4 hours at 80 ° C. The solution was cooled to room temperature, a solution of dibutyl amine (4 mL of a 1.72 molar solution in methyl ethyl ketone) was added, and the solution stirred for 30 minutes. Then 20 mL of methanol and 4–5 drops of Bromphenol Blue indicator were added, and the solution titrated to a yellow endpoint with 3.79 mL of a 1.0 molar hydrochloric acid solution in water. This corresponded to a hydroxyl equivalent weight of 335 (theoretical hydroxyl equivalent weight for this 2:8:27 sulfoyester polyols is 366). From a duplicate titration determination, the hydroxyl equivalent weight of the reaction product was also determined to be 335.

EXAMPLES 30–36

The following Examples of other sulfopolyester polyol precursors were prepared substantially according to the procedure of Example 29. Data for these Examples is shown in Table III, below:

TABLE III

| Example | DMSSIP:DEG:caprolactone | theoretical hydroxyl equivalent weight | found hydroxyl equivalent weight |
|---|---|---|---|
| 30 | 1.33:7:26.6 | 360 | 347 |
| 31 | 1.66:7:26.6 | 389 | 383 |
| 32 | 1:7:22 | 290 | 291 |
| 33 | 1.66:7:16 | 276 | 255 |
| 34 | 2:7:54 | 737 | 787 |
| 35 | 2:7:10 | 235 | 218 |
| 36 | 1:7:26.6 | 334 | 340 |

Examples 37–57, below, teach preparation of silyl terminated poly(ester- urethane)s from the sulfopolyester polyols prepared by the two-step method and show that the water uptakes of the spun cast films are greatly reduced relative to the silyl terminated poly(ester-urethane)s from the sulfopolyester polyol prepared by the one-step method.

EXAMPLE 37

The sulfopolyester polyol of Example 29 with a hydroxyl equivalent weight of 348 (104.4 g, 150 mmol), polycaprolactonediol (26.2 g, 50 mmol, PCP 0201™, average molecular weight 524, available from Union Carbide Corp., Danbury, Conn.), ethylene glycol (15.5 g, 250 mmol), isophorone disocyanate (108.1 g, 486 mmol, available from Huls America, Inc., Piscataway, N.J.), and dibutyltin dilaurate (0.14 g, 0.22 mmol, available from Alfa Chemical Co., Ward Hill, Mass.) were dissolved in methyl ethyl ketone (137 g). The solution was stirred at 80° C. for 3.5 hours, then an aliquot was removed for reaction with dibutylamine and titration with hydrochloric acid solution as described in Example 29. The isocyanate equivalent weight of the product was determined to be 3020. Methyl ethyl ketone (110 g) and 3-aminopropyltriethoxysilane (17.1 g, 77 mmol, available from Aldrich) were added and the solution stirred 30 minutes at 80° C. Water (384 g) at 80° C. was then added to the reaction mixture over about a 5 minute period and methyl ethyl ketone was distilled from the mixture under reduced pressure to produce a dispersion (46% solids) of silanol terminated sulfo(polyester-urethane) in water. Modulated Differential Scanning Calorimetry (MDSC) and tensile property analyses made of a spun cast film produced from the dispersion indicated that the polymer had a Tg of 35° C. and a tensile strength of 31.7 MPa (4602 psi) at 275% elongation. Samples (about 0.5 g) of the film were immersed for 24 hours in tap water and deionized water, respectively. The films were then removed, blotted dry, and weighed to determine water uptake. Water uptake was determined to be 7% in tap water and 8% in deionized water.

The sulfopoly(ester-urethane) of this Example can be prepared in 1-methyl-2-pyrrolidinone (NMP) as described in Example 18, above, and then subjected to a microfluidization procedure analogous to that described in Example 19 above.

EXAMPLE 38

A silanol terminated sulfo(polyester-urethane) was prepared substantially according to the procedure of Example 37 except that the reagents were charged as follows:

The sulfopolyester polyol of Example 29 with a hydroxyl equivalent weight of 348 (104.4 g, 150 mmol), PCP 0201™ (39.3 g, 75 mmol, ethylene glycol (12.4 g, 200 mmol), and isophorone disocyanate (102.8 g, 463 mmol). Modulated Differential Scanning Calorimetry (MDSC) and tensile property analyses made of a spun cast film produced from the 41 % solids dispersion indicated that the polymer had a Tg of 19° C. and a tensile strength of 31.9 MPa (4633 psi) at 402% elongation. Water uptakes were 8% and 9% in tap water and deionized water, respectively.

The sulfopoly(ester-urethane) of this Example as well as of Examples 39–59, below, can be dispersed with various fillers, pigments, and adjuvants in accordance with Example 16 and then applied to a concrete or asphalt surface to provide a pavement marking paint having low water uptake.

EXAMPLE 39

A silanol terminated sulfo(polyester-urethane) was prepared substantially according to the procedure of Example 37 except that the reagents were charged as follows:

The sulfopolyester polyol of Example 35 with a hydroxyl equivalent weight of 235 (93.8 g, 200 mmol), PCP 0201™ (104.8 g, 200 mmol, ethylene glycol (24.8 g, 400 mmol), and isophorone disocyanate (199.8 g, 900 mmol). Tensile property analyses made of a spun cast film produced from the 46% solids dispersion indicated that the polymer had a tensile strength of 39.5 MPa (5732 psi) at 11% elongation. Water uptakes were 7% and 12% in tap water and deionized water, respectively.

EXAMPLE 40

A silanol terminated sulfo(polyester-urethane) was prepared substantially according to the procedure of Example 37 except that the reagents were charged as follows:

The sulfopolyester polyol of Example 33 with a hydroxyl equivalent weight of 255 (102 g, 200 mmol), ethylene glycol (20.7 g, 333 mmol), and isophorone diisocyanate (126.3 g, 568 mmol). Modulated Differential Scanning Calorimetry (MDSC) and tensile property analyses made of a spun cast film produced from the 38% solids dispersion indicated that the polymer had a Tg of 61° C. and a tensile strength of 61.8 MPa (8970 psi) at 8% elongation. Water uptakes were 9% and 9% in tap water and deionized water, respectively.

EXAMPLES 41–57

These samples were prepared in an analogous manner to that described above for Example 37. Data for these samples is shown in Table IV, below.

TABLE IV

| | Sulfopoly (ester-urethane) dispersions | | | | | Properties of Films | | | |
| --- | --- | --- | --- | --- | --- | --- | --- | --- | --- |
| Example | Sulfopolyester polyol used, example no. | Compostion of sulfopoly (ester-urethane)[a] | % solids | Tg, ° C. | tensile strength, psi | tensile strength, MPa | elongation, % | $H_2O$ uptake, %[b] | $H_2O$ uptake, %[c] |
| 41 | 1.66:7:26.6, 31 | 6 SPD:7 EG:14.2 IPDI | 38 | 19 | 5605 | 38.6 | 472 | 7 | 11 |
| 42 | 1.66:7:26.6, 31 | 6 SPD:12 EG: 19.4 IPDI | 36 | 53 | 5412 | 37.3 | 332 | 8 | 9 |
| 43 | 1.66:7:16, 33 | 6 SPD:10 EG:2: DEG:19.2 IPDI | 40 | 61 | 688.0 | 47.4 | 5 | 8 | 8 |
| 44 | 2:8:27, 29 | 6 SPD:12 EG:2: DEG:21.4 IPDI | 45 | 57 | 6818 | 47.0 | 62 | 7 | 7 |
| 45 | 2:8:27, 29 | 6 SPD:1 PCP:12 EG:20.4 IPDI | 45 | 54 | 5335 | 36.0 | 223 | 7 | 7 |

TABLE IV-continued

| | Sulfopoly (ester-urethane) dispersions | | | | Properties of Films | | | | |
|---|---|---|---|---|---|---|---|---|---|
| Example | Sulfopolyester polyol used, example no. | Composition of sulfopoly (ester-urethane)[a] | % solids | Tg, °C | tensile strength, psi | tensile strength, MPa | elongation, % | H$_2$O uptake, %[b] | H$_2$O uptake, %[c] |
| 46 | 2:8:27, 29 | 6 SPD:2 PCP:12 EG:21.5 IPDI | 44 | 49 | 5590 | 38.5 | 318 | 7 | 7 |
| 47 | 2:8:27, 29 | 6 SPD:2 PCP:8 EG:17.2 IPDI | 46 | 25 | 5013 | 34.6 | 378 | 13 | 13 |
| 48 | 2:8:27, 29 | 6 SPD:4 PCP:8 EG:19.5 IPDI | 48 | 22 | 3148 | 21.7 | 491 | 7 | 7 |
| 49 | 2:8:27, 29 | 6 SPD:1 PCP:12 EG:3 DEG:23.5 IPDI | 50 | 51 | 4927 | 34.0 | 40 | 7 | 6 |
| 50 | 2:8:27, 29 | 6 SPD:1 PCP:15 EG: 23.5 IPDI | 40 | 54 | 3660 | 25.2 | 4 | 6 | 6 |
| 51 | 2:8:27, 29 | 6 SPD:2 PC1667 ™: 8 EG:17.4 IPDI | 39 | 50 | 4631 | 31.9 | 136 | 13 | 14 |
| 52 | 2:8:27, 29 | 6 SPD:2 PCP:12 BD:21.5 IPDI | 44 | 35 | 4930 | 34.0 | 445 | 7 | 7 |
| 53 | 2:8:27, 29 | 6 SPD:2.5 PCP: 13 EG:23.1 IPDI | 44 | 51 | 5378 | 37.1 | 251 | 6 | 6 |
| 54 | 2:8:27, 29 | 6 SPD:2 PCP: EG:2 DEG: 23.6 IPDI | 44 | 43 | 3957 | 27.3 | 269 | 9 | 9 |
| 55 | 2:8:27, 29 | 6 SPD:3 PCP:12 EG:22.4 IPDI | 48 | 46 | 6487 | 44.7 | 406 | 6 | 6 |
| 56 | 2:8:27, 29 | 6 SPD:2 PCP:14 EG:23.5 IPDI | 49 | 35 | 4149 | 28.6 | 200 | 6 | 6 |
| 57 | 2:8:27, 29 | 6 SPD:1 PCP:13 EG:2 DEG:23.5 IPDI | 44 | 42 | 8351 | 57.6 | 64 | 5 | 6 |

[a]Parts (relative number of moles) of sulfopolyester polyol: other polyols: isocyanate. SPD is sulfopolyester polyol; EG is ethylene glycol; DEG is diethylene glycol; BD is 1,4-butanediol, available from Aldrich; PCP is PCP 0201 ™, polycaprolactone diol of average molecular weight 524, available from Union Carbide; PC 1667 ™ is a cycloaliphatic polycarbonate diol of number average molecular weight 860, available from Stahl USA, Peabody, MA; IPDI is isophoronediisocyanate.
[b]24 hour water uptake in tap water in weight percent
[c]24 hour water uptake in deionized water in weight percent From examination of the data presented for Examples 37–57 it is evident that the water uptakes of the spun cast films of silyl terminated poly(ester-urethane)s obtained from the sulfopolyester polyols prepared by the two-step, chain extension method were greatly reduced relative to the silyl terminated poly(ester-urethane)s from the sulfopolyester polyol prepared by the one-step method.

EXAMPLE 58

This example teaches chain extension and end capping of an isocyanate functional sulfopoly(ester-urethane) by reaction with a diamine and an amino functional silane in water to produce a silyl terminated poly(ester-urethane).

The sulfopolyester polyol of Example 31 with a hydroxyl equivalent weight of 383 (138 g, 180 mmol), and isophorone disocyanate (80.0 g, 360 mmol, dibutyltin dilaurate (0.15 g, 0.24 mmol) were dissolved in methyl ethyl ketone (118 g). The solution was stirred at 80° C. for 4 hours, then an aliquot was removed for titration as described in Example 37. The isocyanate equivalent weight of the product was determined to be 1057. Water (200 g) was then added with rapid stirring followed by a solution of ethylene diamine (5.1 g, 85 mmol, available from Aldrich) and 3-aminopropyltriethoxysilane (7.37 g, 33 mmol) in water (77 g). After 20 minutes of rapid stirring, another 90 g of water were added and then methyl ethyl ketone was distilled from the mixture under reduced pressure to produce a dispersion (36% solids) of silanol terminated sulfo(polyester-urethane) in water. Modulated Differential Scanning Calorimetry (MDSC) and tensile property analyses made of a spun cast film produced from the dispersion indicated that the polymer had a Tg of 17° C. and a tensile strength of 35.5 MPa (5143 psi) at 557% elongation. Samples (about 0.5 g) of the film were immersed for 24 hours in tap water and deionized water, respectively. The films were then removed, blotted dry, and weighed to determine water uptake. Water uptake was determined to be 11% in tap water and 18% in deionized water.

EXAMPLE 59

A silanol terminated sulfo(polyester-urethane) was prepared substantially according to the procedure of Example 58 except that the reagents were charged as follows:

The sulfopolyester polyol of Example 29 with a hydroxyl equivalent weight of 335 (120.6 g, 180 mmol), and isophorone disocyanate (86.7 g, 390 mmol) were reacted in acetone (112 g) for 4 hours, then a solution of ethylene diamine (10.5 g, 175 mmol) and 3-aminopropyltriethoxysilane (12.9 g, 58 mmol) in water (50 g) was added followed by another 252 g charge of water. Modulated Differential Scanning Calorimetry (MDSC) and tensile property analyses made of a spun cast film produced from the 41% solids dispersion obtained after removal of methyl ethyl ketone at reduced pressure indicated that the polymer had a Tg of 59° C. and a tensile strength of 46.8 MPa (6785 psi) at 418% elongation. Water uptakes were 11% and 15% in tap water and deionized water, respectively.

Various modifications and alterations of this invention will become apparent to those skilled in the art without departing from the scope and intent of this invention, and it should be understood that this invention is not to be unduly limited to the illustrative embodiments set forth herein.

What is claimed is:

1. A method of decreasing the water uptake in a sulfopoly(ester-urethane) by preparing said sulfopoly(ester-urethane) from a chain extended sulfopolyester polyol which itself has been prepared in a two-step method, said sulfopoly(ester-urethane) comprising in its backbone at least one non-terminal arylene or alkylene group comprising a pendant sulfonic acid group or salt thereof, said sulfonic acid group or salt thereof having the formula

wherein R is a trivalent aliphatic or aromatic group and M is a cation, said sulfonic acid group or salt thereof being bonded directly through said aliphatic or aromatic group to ester groups, the polymer of said sulfo(polyester-urethane) being terminated by at least one hydrolyzable silyl group, said two-step method for preparing said chain extended sulfopolyester polyol comprising the steps of:
a) reacting a sulfopolycarboxylic acid or ester with a polyol to produce a sulfopolyester polyol,
b) chain extending said sulfopolyester polyol by an esterification reaction with a lower aliphatic lactone to produce a chain extended sulfopolyester polyol, and said chain extended sulfopolyester polyol then, (1) in one embodiment, being reacted with a stoichiometric excess of a polyisocyanate and at least one of a polyol, polyamine, and polythiol to produce an isocyanate-terminated sulfo(polyester-urethane), which is then reacted with a nucleophilic, hydrolyzable silane, or (2) in a second embodiment being reacted with a polyisocyanate and a stoichiometric excess of at least one of a polyol, polyamine, and polythiol to produce a hydroxyl-, amino-, or mercapto-terminated sulfo(polyester-urethane) which is then reacted with an electrophilic hydrolyzable silane to produce said sulfopoly(ester-urethane), which when dried has decreased water uptake.

2. The method according to claim 1 wherein said sulfopoly(ester-urethane) is an aqueous dispersion.

3. The method according to claim 1 wherein the silyl group of said sulfopoly(ester-urethane) has the formula $Si(Q)_p(OQ)_{3-p}$ where p=0, 1, or 2 and wherein each Q independently is hydrogen or a lower alkyl group having 1 to 4 carbon atoms such that the OQ group, in which Q is a lower alkyl group, is the hydrolyzable unit.

4. The method according to claim 1 wherein said sulfopoly(ester-urethane) has a sulfonate equivalent weight in the range of 500 to 12,000 g/equivalent.

5. The method according to claim 1 wherein said sulfopoly(ester-urethane) has a number average molecular weight less than 50,000.

6. The method according to claim 2 wherein said poly(ester-urethane) is present in an amount up to 70 percent by weight and said aqueous medium comprises 30 weight percent or more of said composition.

7. A sulfopoly(ester-urethane) having decreased water uptake wherein said sulfopoly(ester-urethane) is prepared from a chain extended sulfopolyester polyol which itself has been prepared in a two-step method, said sulfopoly(ester-urethane) comprising in its backbone at least one non-terminal arylene or alkylene group comprising a pendant sulfonic acid group or salt thereof, said sulfonic acid group or salt thereof having the formula

wherein R is a trivalent aliphatic or aromatic group and M is a cation, said sulfonic acid group or salt thereof being bonded directly through said aliphatic or aromatic group to ester groups, the polymer of said sulfo(polyester-urethane) being terminated by at least one hydrolyzable silyl group, said two-step method for preparing said chain extended sulfopolyester polyol comprising the steps of:
a) reacting a sulfopolycarboxylic acid or ester with a polyol to produce a sulfopolyester polyol,
b) chain extending said sulfopolyester polyol by an esterification reaction with a lower aliphatic lactone to produce a chain extended sulfopolyester polyol, and said chain extended sulfopolyester polyol then, (1) in one embodiment, being reacted with a stoichiometric excess of a polyisocyanate and at least one of a polyol, polyamine, and polythiol to produce an isocyanate-terminated sulfo(polyester-urethane), which is then reacted with a nucleophilic, hydrolyzable silane, or (2) in a second embodiment, being reacted with a polyisocyanate and a stoichiometric excess of at least one of a polyol, polyamine, and polythiol to produce a hydroxyl-, amino-, or mercapto-terminated sulfo(polyester-urethane) which is then reacted with an electrophilic hydrolyzable silane to produce said sulfopoly(ester-urethane), which when dried has decreased water uptake.

8. The sulfopoly(ester-urethane) having Formulae IA or IVA and hydrolysis products thereof, wherein Formula IA is:

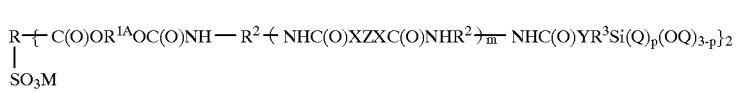

IA wherein

R is a trivalent aliphatic or aromatic group in which M is a cation;

each $R^{1A}$ group independently can be

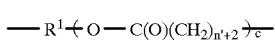

each $R^1$ independently is an alkylene or cycloalkylene group having a number average molecular weight in the range of 100 to 2,000; or a polymeric residue having a molecular weight in the range of 100 to 2,000 comprising carbon, hydrogen, and one or both of nitrogen and non-peroxidic oxygen atoms;

each $R^2$ independently is an alkylene, cycloalkylene, or arylene group;

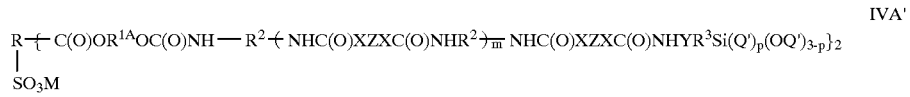
IVA' each X independently is O, S, or $NR^4$, wherein each $R^4$ independently is a lower alkyl group, hydrogen, or an alkylene group bridging to the X group;
m is an integer 0 to 10;
each Z independently is selected from the group consisting of

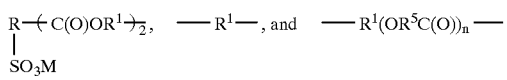

wherein R and $R^1$ are as previously defined,
each $R^5$ independently can be an alkylene group;
p is 0, 1 or 2;
n is an integer 1 to 15;
each n' independently can be an integer from 0 to 18;
each c independently can be an integer from 1 to 25;
each $R^3$ independently is an alkylene group; and
each Y independently is O, S, or $NR^6$
wherein $R^6$ is a lower alkyl group, hydrogen, or $R^3Si(Q)_p(OQ)_{3-p}$,
wherein $R^3$ and p are as previously defined, and
each Q independently is hydrogen or a lower alkyl group having 1 to 4
carbon atoms provided that at least one OQ is an alkoxy group; and
wherein Formula IVA is

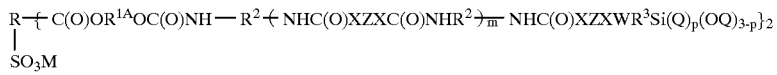

wherein M, R, $R^2$, $R^3$, $R^{1A}$, Q, X, Z, m and p are as previously defined, and
each W independently is

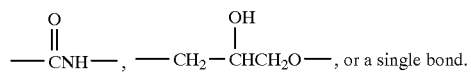

9. The sulfopoly(ester-urethane) according to claim 8 wherein the hydrolysis products thereof have Formulae IA' and IVA',
wherein Formula IA' is

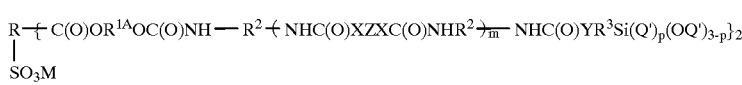

and Formula IVA' is wherein each Q' independently can be hydrogen or a lower alkyl group having 1 to 4 carbon atoms, provided that at least one OQ' is an hydroxyl group; and
wherein R, $R^{1A}$, $R^2$, $R^3$, M, X, Y, Z, W, m, and p are as previously defined.

10. The sulfopoly(ester-urethane) according to claim 7 which is in an aqueous dispersion.

11. The sulfopoly(ester-urethane) according to claim 10 wherein said dispersion is produced using a microfluidization process.

12. A paint comprising
a) an aqueous dispersion comprising a sulfopoly(ester-urethane) polymer having low water uptake prepared according to the method of claim 7, and
b) an effective amount of at least one pigment.

13. The paint according to claim 12 further comprising one or both of optical elements and skid-resistant particles.

14. The paint according to claim 12 further comprising at least one filler or extender.

15. The paint according to claim 12 from which the aqueous medium has been removed.

16. The paint according to claim 12 wherein said optical element is a retroreflective element.

17. A method for preparing a silyl terminated sulfopoly (ester-urethane) comprising the steps of
a) reacting an isocyanate terminated sulfopoly(ester-urethane) of Formula IIA

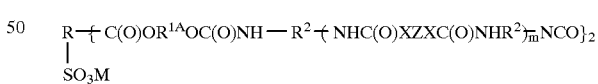
IIA wherein R is a trivalent aliphatic or aromatic group in which M is a cation;

each $R^{1A}$ group independently is

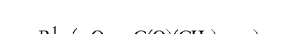

wherein
- each $R^1$ independently is an alkylene or cycloalkylene group having a number average molecular weight in the range of 100 to 2,000; or a polymeric residue having a molecular weight in the range of 100 to 2,000 comprising carbon, hydrogen, and one or both of nitrogen and non-peroxidic oxygen atoms;
- each n' independently can be an integer from 0 to 18;
- each c independently can be an integer from 1 to 25;
- each $R^2$ independently is an alkylene, cycloalkylene, or arylene group;
- each X independently is O, S, or $NR^4$,
  - wherein each $R^4$ independently is a lower alkyl group, hydrogen, or
  - an alkylene bridging group to the other X unit;
- each Z independently is selected from

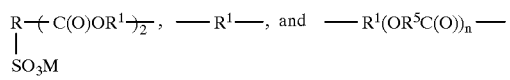

wherein R and $R^1$ are as previously defined,

- each $R^5$ independently is an alkylene group;
- n is an integer of 1 to 15;
- p is 0, 1, or 2;
- m is an integer 0 to 10;

with a nucleophilic hydrolyzable silane agent of Formula III

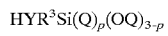   III wherein each $R^3$ independently is an alkylene group having 1 to 10 carbon atoms;
- each Y independently is O, S, or $NR^6$
  - wherein $R^6$ is a lower alkyl group, hydrogen, or

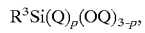

wherein $R^3$ is as previously defined,
- each Q independently is hydrogen or a lower alkyl group having 1 to 4 carbon atoms, provided that at least one OQ is an alkoxy group; and p is as previously defined;

to produce 1) said silyl terminated sulfopoly(ester-urethane) of Formula IA,

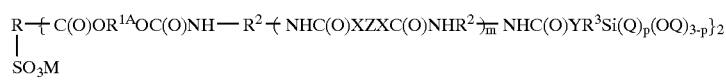   IA wherein R, M, $R^2$, $R^{1A}$, X, Z, Y, $R^3$, Q, m, and p are as previously defined, or 2) a silyl terminated sulfopoly(ester-urethane) having a formula related to Formula IA in which polymer extensions or branching have taken place.

18. A method for producing a silyl terminated sulfopoly (ester-urethane) of Formula IVA comprising the steps of
a) reacting a hydroxy-, amino-, or thiol-terminated sulfopoly(ester-urethane) of Formula VA

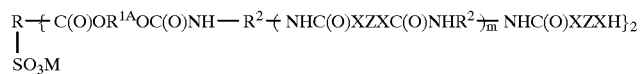   VA wherein R, $R^{1A}$, $R^2$, M, X, Z, and m are as previously defined, with an electrophilic hydrolyzable silane reagent having any of Formulae VIa, VIb, and VIc:

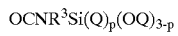   VIa

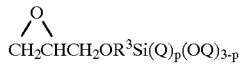   VIb

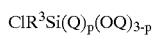   VIc wherein $R^3$, Q, and p are as previously defined, to produce one or both of
1) said silyl terminated sulfopoly(ester-urethane) of Formula IVA:

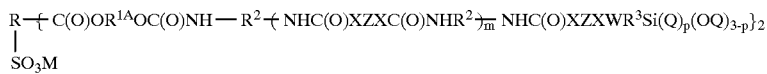

IVA wherein each W independently is

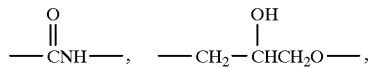

or a single bond, and wherein R, $R^{1A}$, $R^2$, $R^3$, M, Q, X, Z, p, and m are as previously defined, and and 2) a silyl terminated sulfopoly(ester-urethane) having a formula related to Formula IVA in which polymer extensions or branching subsequent to reaction with a polyfunctional nucleophile have taken place.

19. The dispersion according to claim 11 which is a pavement marking paint.

20. The paint according to claim 19 from which said aqueous medium has been removed.

* * * * *

UNITED STATES PATENT AND TRADEMARK OFFICE
CERTIFICATE OF CORRECTION

PATENT NO.: 5,929,160

DATED: July 27, 1999

INVENTOR(S): Larry R. Krepski, Steven M. Heilmann, Daniel E. Mickus, and Wayne K. Larson It is certified that error appears in the above-identified patent and that said Letters Patent is hereby corrected as shown below:

Col. 11, line 63, insert formula label -- IVA --

Col. 13, line 6, insert formula label -- VA --

Col. 14, line 15, "chloropropyltriethoxysilane." should read -- and 3-chloropropyltriethoxysilane. --

Col. 20, line 37, "$H_2MDI$" should read -- $H_{12}MDI$ --

Col. 24, line 28, "since the ratios" should read -- since the ratio --

Col. 26, Table IV, Example 43, Under the column titled: tensile strength, psi,
"688.0" should read -- 6880 --

Col. 27, Table IV, Example 54, Under the column titled: Composition of sulfopoly (ester-urethane),
"6 SPD:2 PCP:" should read -- 6 SPD:2 PCP:12 --

Col. 27, line 32, "isophoronediisocyanate" should read -- isophorone diisocyanate --

Col. 31, line 42, insert formula label -- IVA --

Signed and Sealed this

Twenty-seventh Day of March, 2001

Attest:

NICHOLAS P. GODICI

Attesting Officer

Acting Director of the United States Patent and Trademark Office